US007467108B2

(12) United States Patent
Papka (10) Patent No.: US 7,467,108 B2
(45) Date of Patent: Dec. 16, 2008

(54) SYSTEM AND METHOD FOR PREDICTING SECURITY PRICE MOVEMENTS USING FINANCIAL NEWS

(76) Inventor: Ron Papka, 20 Byron Rd., Short Hills, NJ (US) 07078

( * ) Notice: Subject to any disclaimer, the term of this patent is extended or adjusted under 35 U.S.C. 154(b) by 1225 days.

(21) Appl. No.: 10/113,895

(22) Filed: Mar. 28, 2002

(65) Prior Publication Data

US 2003/0187772 A1 Oct. 2, 2003

Related U.S. Application Data

(60) Provisional application No. 60/350,264, filed on Jan. 18, 2002.

(51) Int. Cl.
  *G06Q 40/00* (2006.01)
(52) U.S. Cl. .................. 705/36 R; 705/35; 705/37
(58) Field of Classification Search .......... 705/36 R, 705/35–45, 100, 28–34; 727/1–22
See application file for complete search history.

(56) References Cited

U.S. PATENT DOCUMENTS 5,761,422 A * 6/1998 Westin et al. ............... 709/213

6,313,833 B1 * 11/2001 Knight ...................... 705/36 R
6,968,316 B1 * 11/2005 Hamilton .................. 705/36 R

OTHER PUBLICATIONS

Robert P Schumaker and Hsinchun Chen. "Evaluating a news-aware quantitative trader: The effect of momentum and contrarian stock selection strategies", Journal of the American Society for Information Science and Technology. Hoboken: Jan. 15, 2008. vol. 59, Iss. 2; p. 247.*

* cited by examiner

*Primary Examiner*—Mary Cheung
*Assistant Examiner*—Kirsten Apple
(74) *Attorney, Agent, or Firm*—Abelman, Frayne & Schwab (57) ABSTRACT

A method of creating a price prediction model that forecasts short-term price fluctuations in financial instruments by collecting, analyzing and classifying financial news for a financial instrument into categories. Distributions for the changes in price of the financial instrument for a set period of time and distributions for the changes in price of the financial instrument as a result of the financial news for each news category for a set period of time are then obtained. If the distributions for the changes in price of the financial instrument are statistically significantly different than the distributions for the changes in price of the financial instrument for a particular news category, and the mean for the change in price is greater or less than zero, a signal is produced indicating the trading action that should be taken for the financial instrument.

18 Claims, 12 Drawing Sheets

FIG. 1

Ryanair buys 100 Boeing 737s in $9.1 bln deal  ■ January 24, 2002 6:10 AM

GKN Buys Boeing Production Facility  ■ January 24, 2002 5:56 AM

SIA defers six Boeing planes  [J] January 24, 2002 5:12 AM

Singapore Air Defers Delivery Of 6 Boeing Aircraft  ■ January 24, 2002 5:08 AM

| Ticker | t+1 | t+2 | RESULTS ||||||
|---|---|---|---|---|---|---|---|---|
| | | | Open 9/4/01 | Close 9/28/01 | Buy and Hold Return (%) | Model Return (%) | # of Trades | Model v. B&H (%) |
| AA | | | 38.54 | 31.01 | -19.54 | 0.00 | 0 | 19.54 |
| AXP | | | 36.45 | 29.06 | -20.27 | 0.00 | 0 | 20.27 |
| BA | | | 49.95 | 33.50 | -32.93 | 27.29 | 11 | 60.22 |
| CAT | | | 50.38 | 44.80 | -11.08 | 0.00 | 0 | 11.08 |
| DD | | | 41.16 | 37.52 | -8.84 | 10.43 | 6 | 19.27 |
| EK | | | 45.27 | 32.53 | -28.14 | 0.00 | 0 | 28.14 |
| HD | | | 46.82 | 38.37 | -18.05 | 7.47 | 4 | 25.52 |
| JPM | | | 39.83 | 34.15 | -14.26 | 0.00 | 0 | 14.26 |
| JNJ | | | 56.15 | 55.40 | -1.34 | 0.64 | 4 | 1.97 |
| KO | | | 49.50 | 46.85 | -5.35 | 0.00 | 0 | 5.35 |
| MCD | | | 30.78 | 27.14 | -11.83 | -4.92 | 6 | 6.91 |
| MMM | | | 104.55 | 98.40 | -5.88 | 0.00 | 0 | 5.88 |
| MO | | | 47.94 | 48.29 | 0.73 | 0.00 | 0 | -0.73 |
| PG | | | 75.52 | 72.79 | -3.61 | 5.87 | 4 | 9.48 |
| T | | | 18.97 | 19.30 | 1.74 | -0.91 | 4 | -2.65 |
| XOM | | | 40.75 | 39.40 | -3.31 | -0.74 | 1 | 2.57 |
| 16 Stocks | | | | | -11.37 | 2.82 | 40 | 14.19 |

FIG. 5

SYSTEM AND METHOD FOR PREDICTING SECURITY PRICE MOVEMENTS USING FINANCIAL NEWS

PRIORITY

This application claims priority based upon a application 60/350,264 filed on Jan. 18, 2002.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

One "Holy Grail" in the financial markets is the development of an automated system that predicts price movements of financial instruments. If one is able to predict whether prices were moving up or down for financial instruments such as stocks, bonds and commodities, then one would have a method of generating money. Several prediction strategies exist that find patterns in price fluctuations. They fall into two categories: fundamental analysis and technical analysis. Fundamental analysis is performed by an analyst that keeps abreast of the news and data affecting a specific stock or market. The successful analyst warehouses correlation in the market and predicts the correct trend. This type of analysis often involves a prediction with a long-term horizon, such as a few months or years. Technical analysis is performed by a person or machine that looks for numeric trends in the change in financial and economic measures. Technical analysis is often used for short-term and long-term trading. The following invention is a fusion of fundamental and technical analysis. The invention predicts the movement of a financial instrument given historical closing prices and daily financial news about the underlying financial instrument.

The Engineering and Economic literature is replete with approaches that use historical stock prices and economic values for predicting when to purchase a stock. For example, Yoon and Swales use a four-layered neural network to determine well performing firms and poorly performing firms using nine economic measures as input. [1] However, these approaches, whether they use neural networks or statistical regression, do not incorporate the events, and in particular, the news events that are responsible for the actual day-to-day price movements.

Economic news event studies have motivated several research projects. A typical event study would determine if a correlation exists between price changes and a particular event such as stock splits, merger announcements, or the reporting of earnings. The example on page A-5 in this document contains an example using takeover announcements. Other related research uses proxies for a more general classifications of news. For example, Depken [4] uses a decomposition of volume as a proxy for "Good" and "Bad" to study how split-stocks react to news. In this work and others, the measure of interest is the statistical variance of volume and price changes. However, it is not clear that event studies using variance or volatility as the measure of interest have predictive value. Volatility can be defined as the standard deviation (square of the variance) of the annual expected return of a security. By definition, volatility does not predict the direction of price movements, only a dispersion of possible annual returns, both negative and positive.

Upon close examination of the Economic event study literature, it is evident that prediction is not the purpose of the research. The motivation of this research is to find and explain a market behavior in the context of a correlation between specific events and price changes. Thus, much of the research does not provide results for prediction, or recommend how the techniques described could be used in a prediction process. See Chan [3] provides a comprehensive summary of other related research regarding Economic event studies.

There is some recent research from the Machine Learning and Information Retrieval literature that is concerned with prediction. This research attempts to correlate particular words in the news publications with subsequent price changes. For example, Fawcett and Provost [5] attempt to discover sets of words that often occur with 10% price changes in a stock. This type of text retrieval process shares a similarity to the invention described here, because it is extensible to events in general and not specific to predefined events. However, in this type of research, specific words predict when a particular price change event will occur, and there is no attempt to use an analyst's classification of "news" as input.

SUMMARY OF THE INVENTION

This SYSTEM AND METHOD FOR PREDICTING SECURITY PRICE MOVEMENTS USING FINANCIAL NEWS forecasts short-term price fluctuations in domestic or international stocks. However, the present invention may be utilized for any financial instrument and the embodiment of this approach is not limited to applications in the stock market.

In one specific embodiment of the approach, textual financial documents obtained from public interest web sites were reviewed by financial analysts and classified to be either "good news" or "bad news" relative to the expected performance of a financial instrument. In addition, "mixed news" and "mention news" were used as classifications for financial news. Distributions of price changes for a particular financial instrument were sampled from the data based on the occurrences of the different classification of news. In this embodiment of the approach, the distributions were used to form a model that produces buy, sell, and no-trade signals for the financial instrument. The model is then used to predict when to buy, sell or not trade the stock given the daily occurrences of the underlying company's financial news.

DETAILED DESCRIPTION OF THE INVENTION

The salient distinction between this invention and previous approaches is the novel use of news as the input to the price prediction model. In embodiments of this invention, an analyst classifies or judges financial news articles using the following four classes or categories:

GOOD—good news; an event that improves the fundamental outlook of the company (for example: 'results of a study that proved the high effectiveness of JNJ's coated stents, and cited it as likely the first to receive government approval'), better than expected earnings, a new contract, the expectation of new business, the acquiring of key personnel, etc.

BAD—bad news; something financially detrimental to the company or its industry, events such as extremely large litigation settlements, pipeline shutdowns due to indeterminately long political turmoil, unexpected poor earnings, loss of key clients, loss of key personnel, announcement of bankruptcy, unusual insider selling, etc.

MIXED—mixed news; some good and some bad news mixed in the same story, article not specifying why the price movement was contrary to what the fundamentals indicated (for example: 'while the earnings were bad year over year, they were better than consensus'), bad earnings with expectation of good earnings growth, layoffs implying improved bottom line, loss of business and gain of new business, etc.

MENTION—mention news; the company's name is mentioned in an article in passing (for example: 'JNJ is the second largest pharmaceutical company, behind MRK'), a fundamental change in a company that was announced weeks ago, etc.

Figure 4:
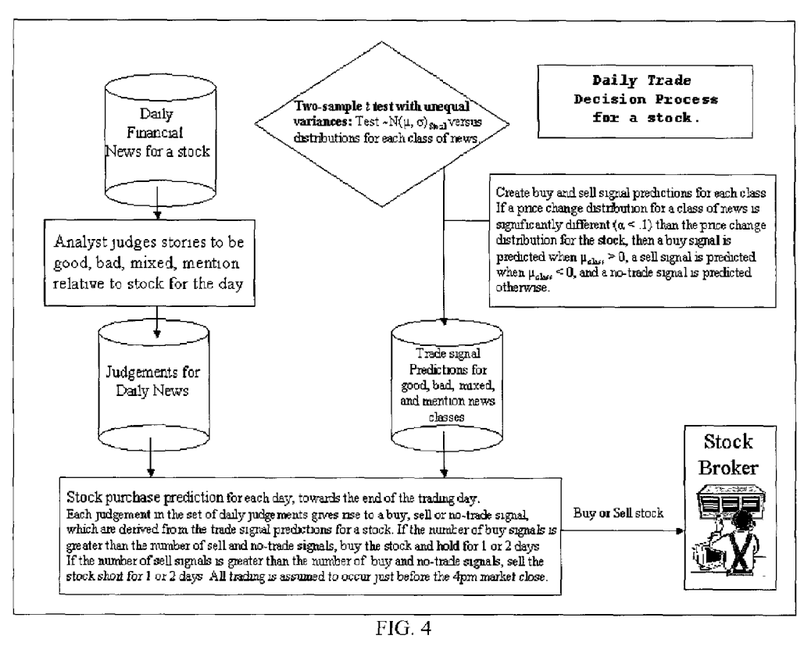
FIG. 4: Daily Trade Decision Process for a Stock.
Figure 4B:
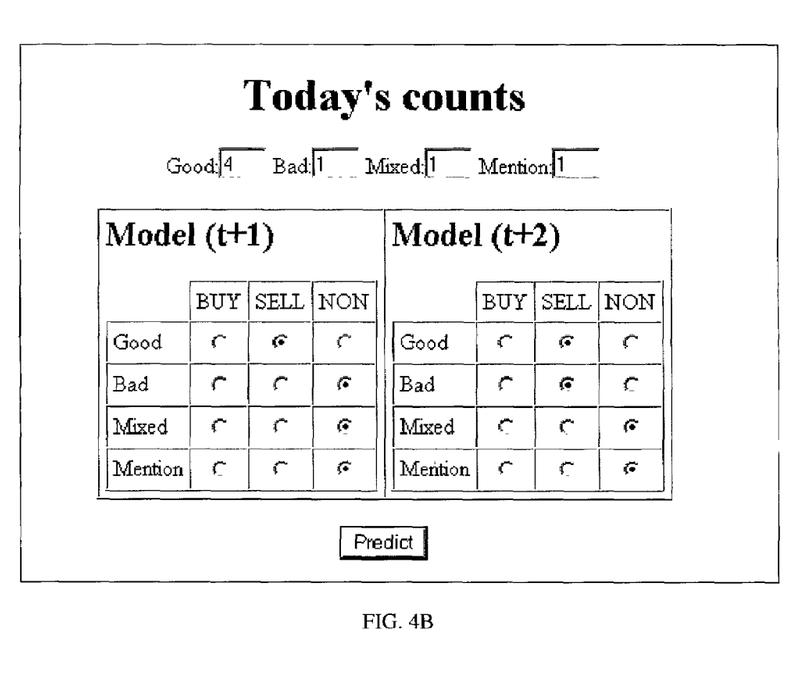
FIG. 4B: Apparatus used to predict price direction given prediction models.

The judgments for stories are used for two purposes: 1) to build a price prediction model (see FIGS. 1-C); and 2) to be used as input for a daily price prediction process for making actual trades (see FIGS. 4A-B). Clearly, the analyst's judgments are subjective, but it is assumed that the analyst is an expert and has experience in the financial markets, and has some specification for the guidelines of the different categories. The above set of classes or categories would be useful for stocks.

In one embodiment of the invention, analysts classified financial news stories that were available on the internet from various news feeds. The stories and articles were from the Associated Press and Reuter's financial news wire about publicly traded companies. For the purpose of this embodiment, a total of three analysts were used with Masters degrees in Business Administration, and backgrounds comprising several years of financial markets experience. They were given guidelines similar to those listed above. In this embodiment, classification was based on the impact of the event on the financial outlook of the company, and not whether the stock price would go up or down.

Figure 1:
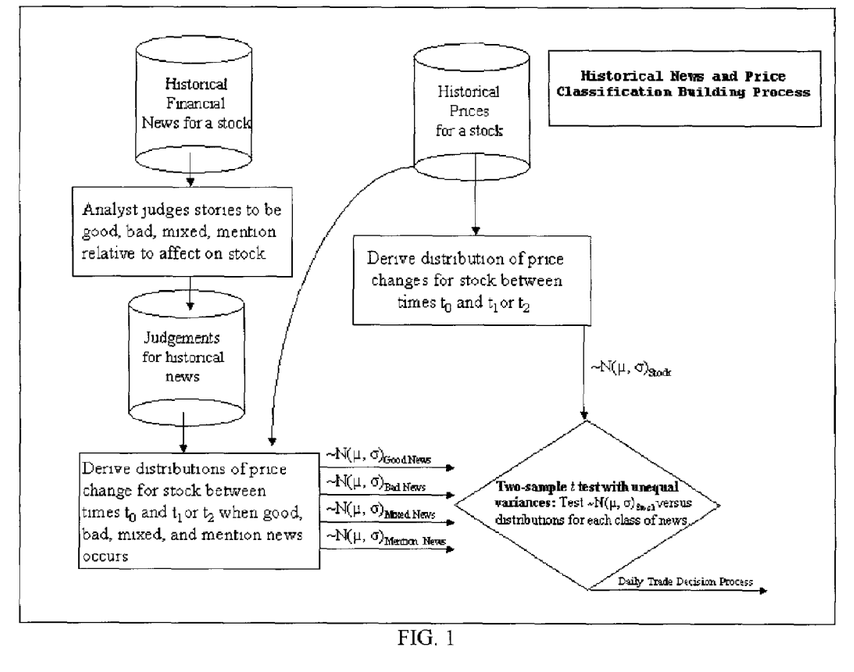
FIG. 1: Historical News and Price Classification Building Process.

A price prediction model for a stock is determined using historical closing prices and a set of financial news judgments for the articles about the stock. The approach is illustrated in FIG. 1. The first step is to use historical daily closing prices for the stock and determine an estimated mean, $\mu_{stock}$ and standard deviation, $\sigma_{stock}$, for the change in price for a stock. The change in price for a stock between times $t_i$ and $t_j$ is: (closing price $(t_j)$–closing price $(t_i)$)/closing price $(t_i)$. During the training period for the stock's price prediction model, distributions are gathered where $t_j$–$t_i$ are 1 and 2 business days apart. The distribution of price changes for the sample is assumed to be approximately Normal (bell shaped curve), and the distribution is represent as ~N($\mu_{stock}$, $\sigma_{stock}$), or ~N($\mu$, $\sigma$) as a shorthand.

For example, assume we have a stock with the following data:

Stock: XMPL

| Date | Closing Price | News Class | 1-Day Change in Price (%) | 2-Day Change in Price (%) |
|---|---|---|---|---|
| Jan. 2, 2002 | 1.00 | GOOD, 1 article | | |
| Jan. 3, 2002 | 1.50 | BAD, 1 article | 0.50 | |
| Jan. 4, 2002 | 1.25 | No News | −0.17 | −0.25 |
| Jan. 5, 2002 | 2.00 | No News | 0.60 | 0.33 |

EXAMPLE 1

The training period is Jan. 2, 2002-Jan. 5, 2002.

The distribution of the 1-day change in price of the stock in general is:

$t_1=0.5, t_2=-0.17, \text{ and } t_3=0.6$

The distribution of the 2-day change in price of the stock in general is:

$t_2=-0.25, \text{ and } t_3=0.33$

Incorporated herein is reference to pages A-1 to A-3 of the Appendix, which provide a description and equations for calculating the mean and standard deviation of a distribution.

Figure 1B:
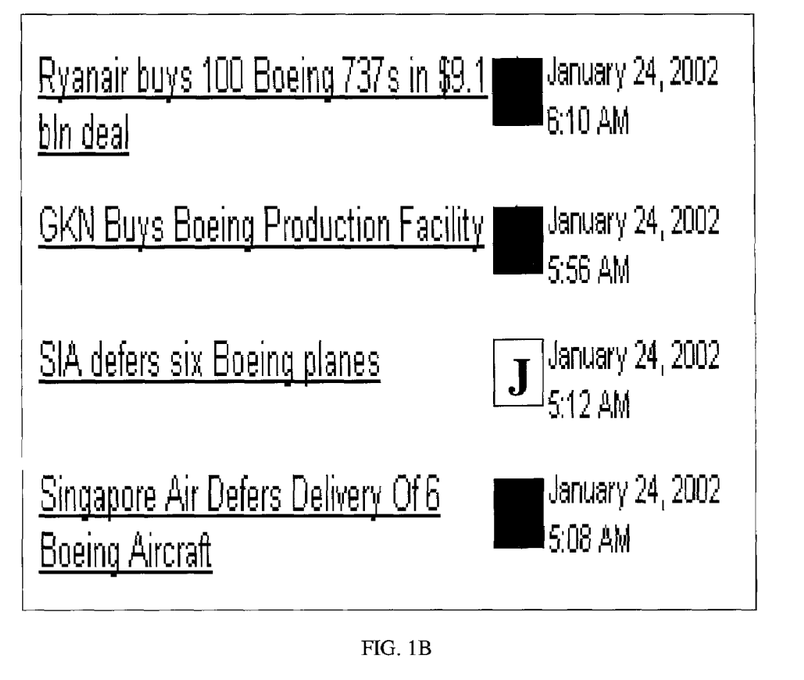
FIG. 1B: Apparatus used by an analyst to visualize news articles and associated news classifications.
Figure 1C:
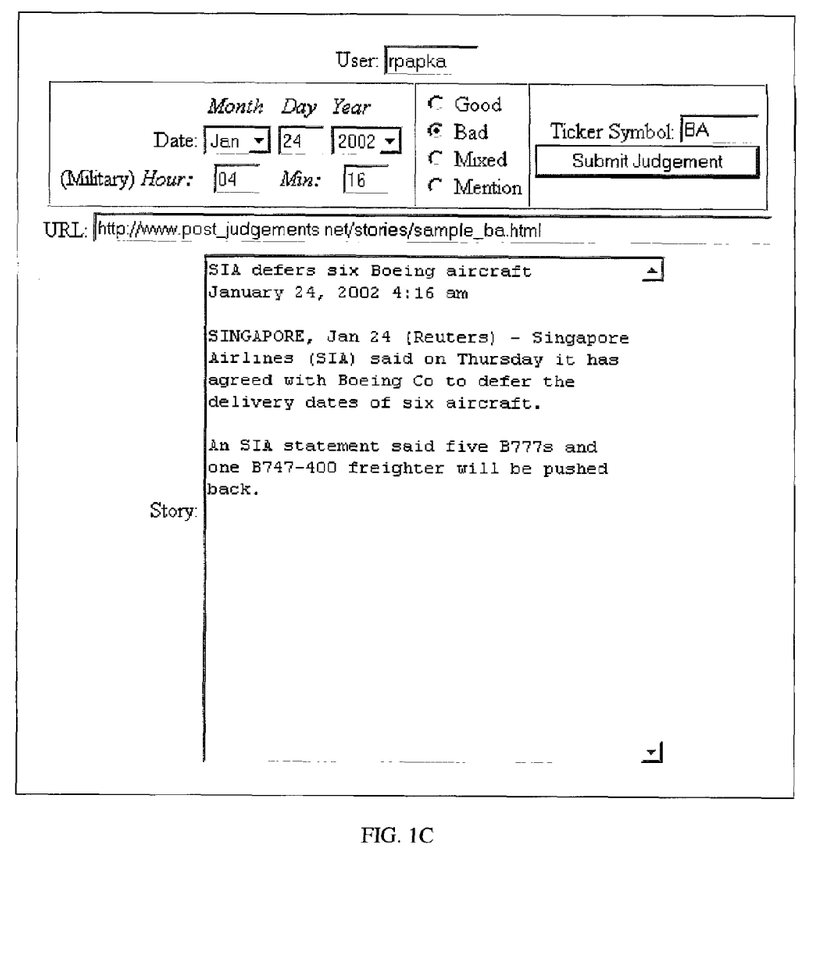
FIG. 1C: Apparatus used to gather a classification for a news article.

The apparatus for collecting analyst classification via a website is illustrated in FIGS. 1B-C. A listing of news article titles for a company is displayed on the computer screen. In addition, each article has a graphic indicating the classification of the article, or a graphic indicating that the article needs to be classified. FIG. 1B refers to one embodiment of the invention which shows that an arrow pointing upwards in a green box indicates that the article was classified as good news, and an arrow pointing downwards in a red box indicates that the article was classified as bad news. Both an arrow pointing upwards and an arrow pointing downwards in a yellow box indicates mixed news and a horizontal line in a gray box indicates mention news. If a J appears in the box, an analyst would click on the box and would enter the information required to maintain the classification for the stock's news over time. FIG. 1C shows an exemplary screen of the website template used to collect the classification for each article of news. The stock's ticker, the date/time of the article, the location of the article, and the analyst's classification are entered. When done, the analyst clicks the 'Submit Judgment' button on the graphic user interface. The classifications are used with daily price changes to build the price prediction model for a stock.

Price change distributions for the days when news appear are determined for each class or category of news. For example, if at $t_i$ there existed an article assessed as "good news", the price change between $t_i$ and $t_j$ would become a member of the sample distribution for good news, which is assumed to be approximately Normal and represented as ~N($\mu_{good}$, $\sigma_{good}$). In addition, distributions ~N($\mu_{bad}$, $\sigma_{bad}$), ~$N(\mu_{mixed}, \sigma_{mixed})$, and ~$N(\mu_{mention}, \sigma_{mention})$ are also determined for days where bad, mixed, and mention news appear in the news.

Referring to Example 1 above:

The distribution of the 1-day change in price of the stock when good news appears is:

$$t_1=0.5$$

The distribution of the 2-day change in price of the stock when good news appears is:

$$t_2=-0.25$$

The distribution of the 1-day change in price of the stock when bad news appears is:

$$t_2=-0.17$$

The distribution of the 2-day change in price of the stock when bad news appears is:

$$t_3=0.33$$

The five distributions are used to create the price prediction model. The price prediction model has four classifiers that produce buy, sell, and no-trade signals. There is one classifier ($C_{class}$) for each news class, i.e., good, bad, mixed, and mention news ($C_{good}$, $C_{bad}$, $C_{mixed1}$, $C_{mention}$). $C_{class}$ produces a buy signal for a news class, if (~$N(\mu_{class}, \sigma_{class})\neq$~$N(\mu_{stock}, \sigma_{stock})$) and $\mu_{class}>0$), a sell signal if (~$N(\mu_{class}, \sigma_{class})\neq$~$N(\mu_{stock}, \sigma_{stock})$) and $\mu_{class}>0$), and a no-trade signal otherwise. (~$N(\mu_{class}, \sigma_{class})\neq$~$N(\mu_{stock}, \sigma_{stock})$) is determined by a statistical hypothesis test that tests if the distributions are significantly different. Incorporated herein is reference to pages A-4 to A-6 of the Appendix, which describe a significance test for determining significantly different distributions.

If the distributions are significantly different, then the particular $C_{class}$ will produce a buy signal when $\mu_{class}>0$, and a sell signal when $\mu_{class}<0$. If the distributions are not significantly different, or $\mu_{class}=0$, then $C_{class}$ will produce a no-trade signal.

When the price distribution of the class of news is statistically and significantly different than the price distribution of the stock in general, i.e., (~$N(\mu_{class}, \sigma_{class})\neq$~$N(\mu_{stock}, \sigma_{stock})$), it may be inferred that the occurrence of $\mu_{class}\neq\mu_{stock}$ is above and beyond random chance. In terms of price movement, it is implied that, on average, the change in price of a stock will be $\mu_{class}$ when articles from the news class appear, and not $\mu_{stock}$. For example, if a stock which has historically moved up an average of 0.01% a day moves up an average of 2% on a day when good news appears, this implies that an investor can improve upon a buy and hold return strategy for the stock by investing only on the days when good news appear. If this event occurred 5 times in the course of a year, the investor would have an estimated return of 10%. The buy and hold strategy has an estimated return of roughly 2.8%.

In one embodiment of the invention (see FIGS. 2A-2E), price change distributions for Boeing were calculated for the trading days between Jun. 30, 1999 and Aug. 31, 2001 for every $t_j-t_i=2$ business days. In addition, distributions for the 2-day price changes were collected for the four classes of good, bad, mixed, and mention news. The five distributions are specified in the legend of the graph in FIG. 2A, and shown individually relative to the 2-day changes in price of Boeing's stock in FIGS. 2B-2E.

Figure 2A:
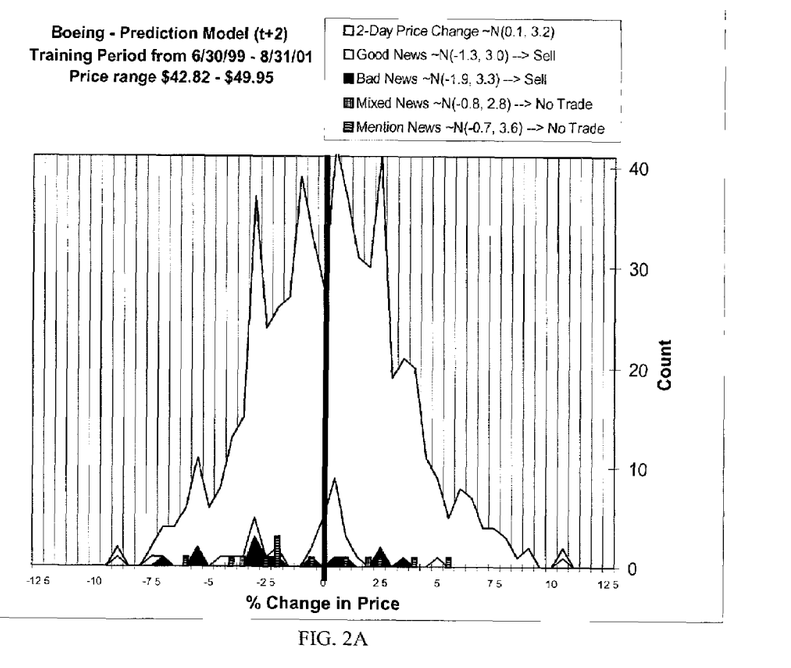
FIG. 2A: Prediction Model and 2-day price change distribution for a stock and for four classes of news.
Figure 2B:
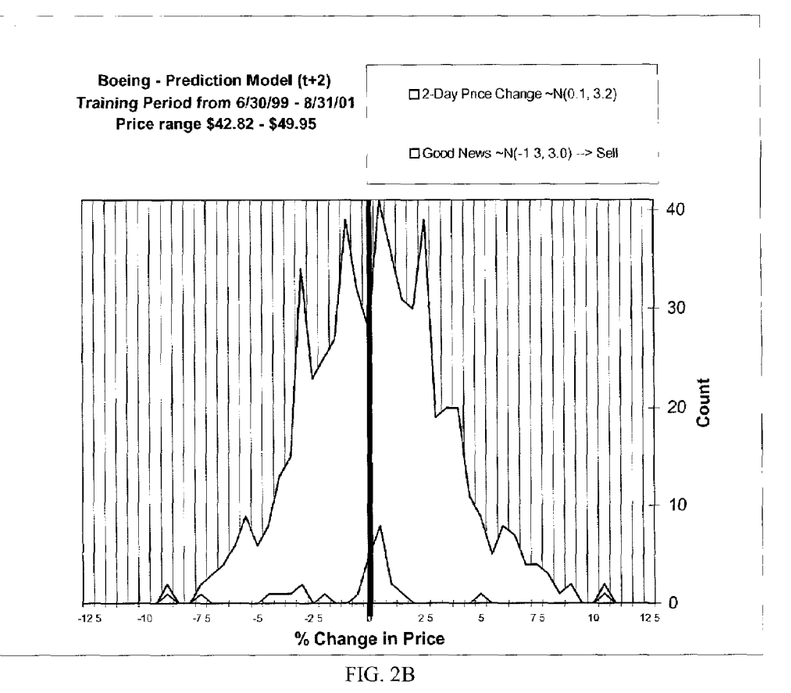
FIG. 2B: Prediction Model and 2-day price change distributions for a stock and for days when good news appears.
Figure 2C:
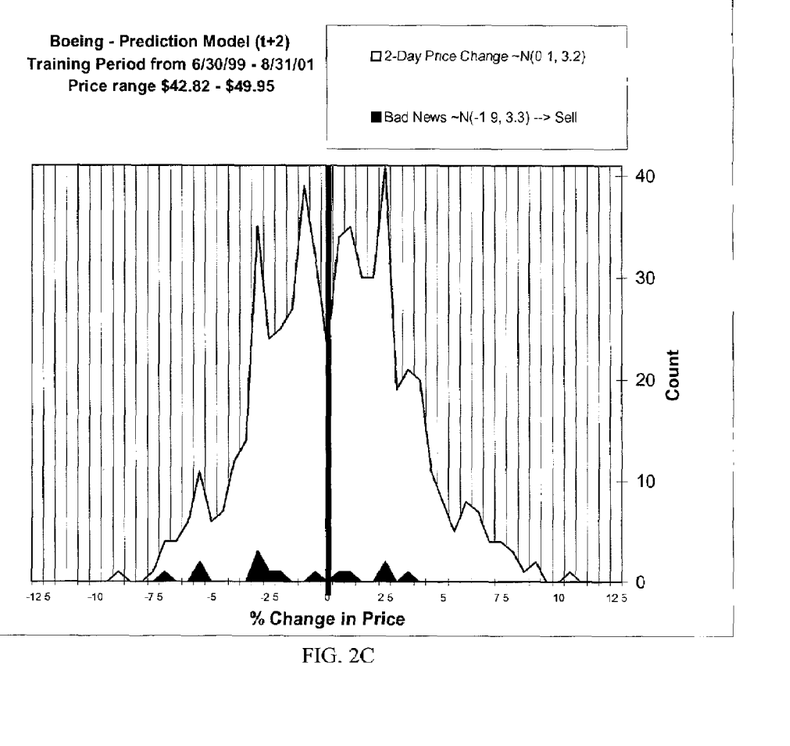
FIG. 2C: Prediction Model and 2-day price change distributions for a stock and for days when bad news appears.
Figure 2D:
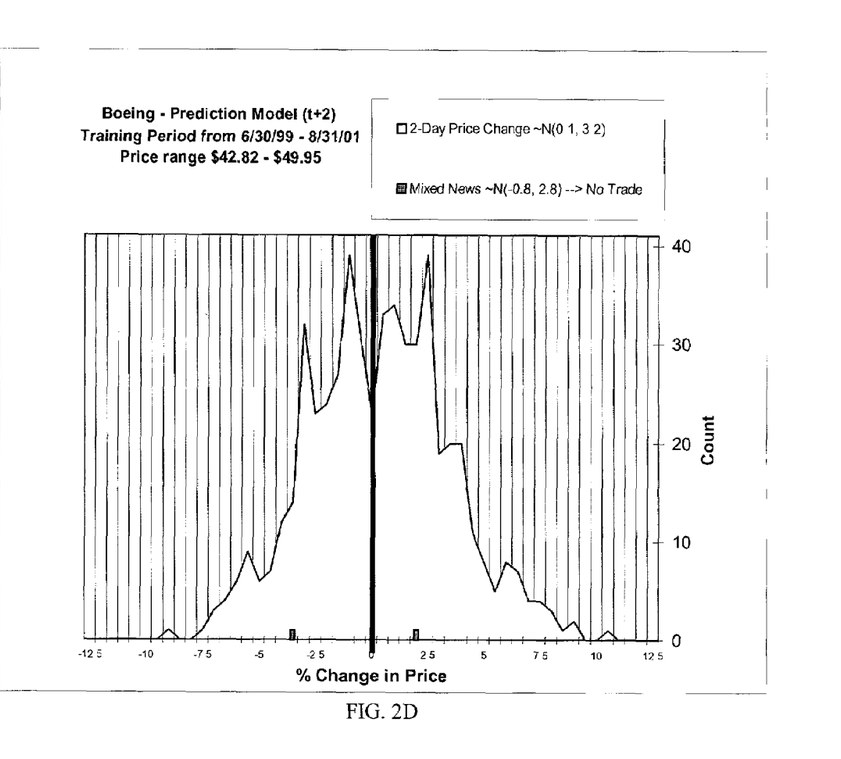
FIG. 2D: Prediction Model and 2-day price change distributions for a stock and for days when mixed news appears.
Figure 2E:
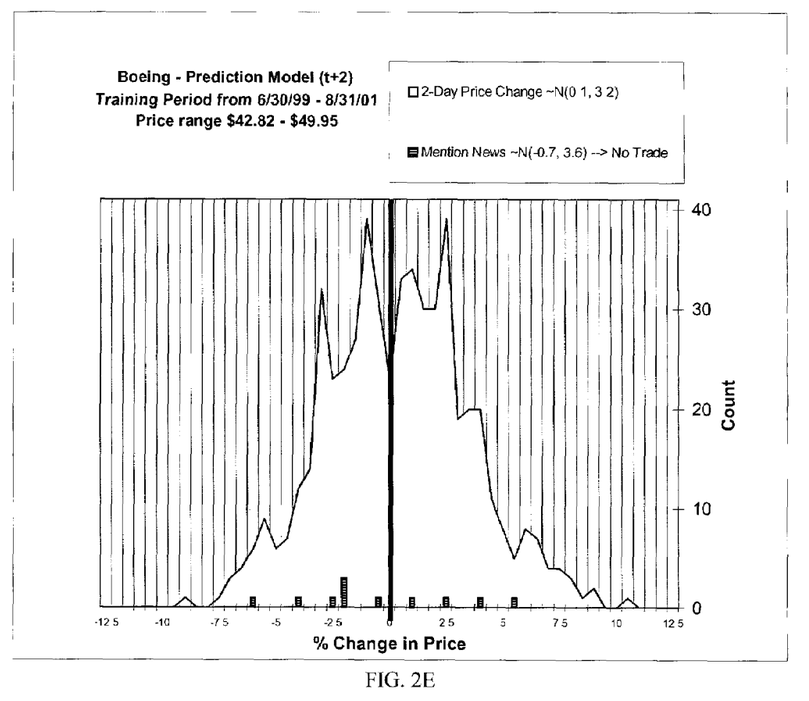
FIG. 2E: Prediction Model and 2-day price change distributions for a stock and for days when mention news appears.

In FIG. 2B, the distributions of 2-day price changes between Jun. 30, 1999 and Aug. 31, 2001 are plotted for Boeing in general (white area) and for days when good news appears (grey area within white area). For example, there were 2 occurrences of Boeing's stock going down −7.5% over a 2-day period when good news was reported. On average, over a 2-day period when good news appeared on day $t_i$, the stock went down −1.3% with a standard deviation of 3.0%. The stock of Boeing was up an average of 0.1% over a 2-day period independent of the type of news reported. The standard deviation for the 2-day price change of the stock in general was 3.2% and is listed with the distribution based on good news in the legend of FIG. 2B. In FIG. 2C the distribution of 2-day price changes is graphed when bad news was reported. The stock went down an average of −1.9% with a standard deviation of 3.3%. In FIG. 2D the distribution for mixed news appears, and the stock went down an average of −0.8% with a standard deviation of 2.8%. In FIG. 2E the distribution of 2-day price changes when the stock is mentioned has an average of −0.7% with a standard deviation of 3.6%. Note that the distributions for mixed and mention news are sparse and they only contain a few articles in the sample of articles available during this time period.

In this embodiment of the invention, a two-sample t-test with unequal variance was used. In this embodiment of the invention, $\alpha<0.1$ was used as a threshold, to determine whether there was a significant difference between the sample distributions of 1 and 2-day price changes for the stock and the sample distribution of 1 and 2-day price changes for the stock when news from a particular news class appears. The 2-day distributions for Boeing are illustrated in FIGS. 2A-E. The four classifiers that create the 2-day prediction model for Boeing are depicted in the legend of FIG. 2A. The distributions for good news (FIG. 2B), and bad news (FIG. 2C) were significantly different than the distribution of 2-day price changes for the stock in general. Since the means of the good and bad news price distributions are negative ($\mu_{good}<0$, $\mu_{bad}<0$), the prediction for their associated classifiers will both be sell signals. The mixed news (FIG. 2D) and mention news (FIG. 2E) distributions were not significantly different than the distribution of the stock in general, and their classifiers in the 2-day prediction model for Boeing will produce no-trade signals.

In another embodiment of the invention (see FIG. 2F), the 1-day price change distributions for Boeing were calculated for the trading days between Jun. 30, 1999, and Aug. 31, 2001 for every $t_j-t_i=1$ business day. In addition, distributions for the 1-day price changes were collected for the four good, bad, mixed, and mention news classes. In FIG. 2F, the distributions of 1-day price changes between Jun. 30, 1999 and Aug. 31, 2001 are plotted for Boeing in general (white area) and for days when bad news appears (black area within white area). On average, over a 1-day period when bad news appeared on day $t_i$, the stock went down −1.2% with a standard deviation of 2.3%. The stock of Boeing was up an average of 0.06% over a 1-day period in general. In this embodiment of the invention, bad news gave rise to a classifier with a sell signal, because the distribution of price changes when bad news appeared was statistically significantly different based on the t-test described above and because the mean of the bad news was negative ($\mu_{bad}<0$). The other classes of news gave rise to classifiers producing no-trade signals.

Figure 3:
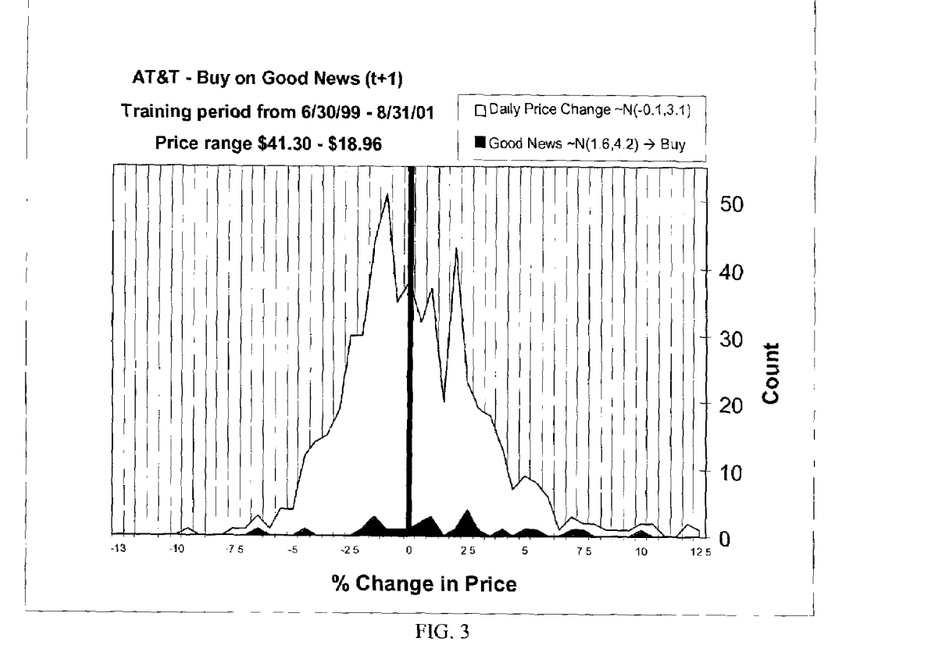
FIG. 3: Prediction Model and 1-day price change distributions for a stock and for days when good news appears.

In another embodiment of the invention (see FIG. 3), the same parameters for the t-test were used to determine that a buy signal is predicted when stories discussing good news about AT&T appear. This was the case since the 1-day distribution of price changes for AT&T in general is statistically significantly different than the 1-day distribution of prices changes for days when articles containing good news appear and because the mean of the good news was positive ($\mu_{good}$>0). The bad, mixed and mention distributions resulted in classifiers that produced no-trade signals.

The daily price prediction process (see FIG. 4A) which can be used for making actual trades incorporates the price prediction model for a stock which is described above and the analysts' classifications for news stories that appeared between the previous day's market close until the time of prediction. Each article about the stock during this time period is considered the stock's daily financial news. Each article is categorized by an analyst, and gives rise to one buy, sell, or no-trade signal. The stock is purchased and held for 1 day (when $t_j-t_i=1$) for an embodiment of the invention if the number of buy signals is greater than the number of sell and no-trade signals combined. The stock is sold short and the trade unwound after 1 day (when $t_j-t_i=1$) if the number of sell signals is greater than the number of buy and no-trade signals combined.

In general, once the price prediction models are calculated for a financial instrument, the price prediction process is easily applied. The daily news for the financial instrument is categorized into good, bad, mixed, and mention news. Each article produces a trade signal depending on its news class and its associated classifier in the prediction model. If the number of buy signals exceeds the number of sell and no trade signals, then the instrument is purchased and then sold in 1 or 2 days (depending on the number of days used to gather the distributions). If the number of sell signals exceeds the number of buy and no-trade signals, the instrument is sold short and then repurchased in 1 or 2 days. A no-trade decision is made when neither a buy or sell decision is predicted.

For example, once the prediction models for Boeing are determined (see FIGS. 2B-F), the apparatus in FIG. 4B, which is an embodiment of the invention, can be used to predict future 1 day and 2 day price movements given the stock's prediction model. As depicted in FIGS. 2B-F, Boeing resulted in a prediction model for $t_j-t_i=1$ (see FIG. 2F) such that a sell signal results for good news and a no-trade signals resulted for all other classifications of news. The prediction model for $t_j-t_i=2$ (see FIG. 2B) such that a sell signal results for good and bad news and a no-trade signals resulted for mixed and mention news. If Boeing had 4 good, 1 bad, 1 mixed, and 1 mention news article appear between the time of trading and the previous market's close, then the prediction would be to sell Boeing and unwind the trade for a 1 day, and also (in a separate trade) to sell Boeing and unwind the trade in 2 days.

Figure 5:
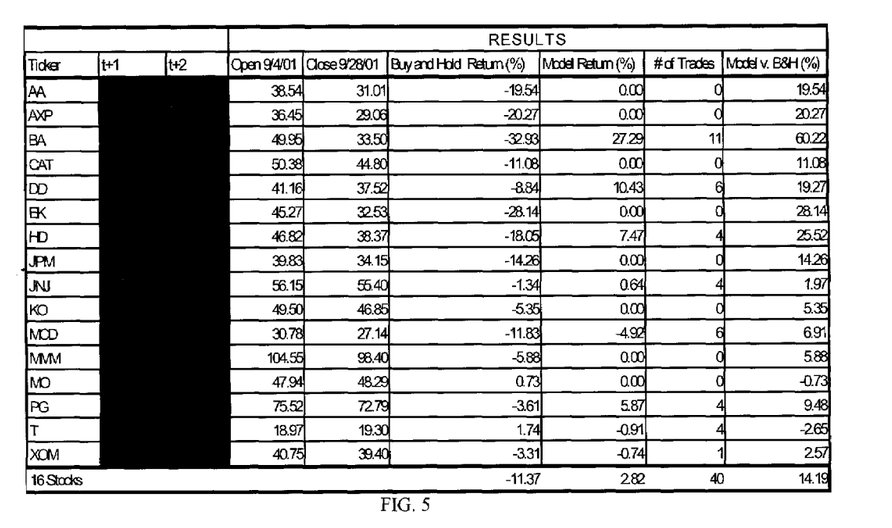
FIG. 5: Sample Return Effectiveness based on 16 Stocks.

One embodiment of this invention assumes that prediction and trading will occur a few minutes before the 4pm stock market close of the current day. 16 stocks were monitored and their price prediction models were determined using distributions for 1 and 2-day price changes. The stock prediction models were based on historical closing prices and financial news occurring on the trading days between Jun. 30, 1999, and Aug. 31, 2001. The results are presented in FIG. 5. In total, 40 trades were predicted for the time period between Sep. 4, 2001 and Sep. 28, 2001. The average buy and hold return for this period was −11.37%, and the average prediction model return, or the resulting return using an embodiment of the invention was 2.82% in the same period. The results suggest that using this invention produces a significantly greater return on investment than a buy and hold strategy. The data also suggests that for some stocks, there exists a correlation between the price movement of the stock, and the appearance of good, bad, mixed, and mention news.

Although the invention has been described and illustrated in the context of stocks, it is to be dearly understood that the same is intended by way of illustration and example only, and is not to be taken by way of limitation. The spirit and scope of this invention is also applicable to financial instruments of any kind that are affected by publicly available news.

I claim:

1. A method for creating a price prediction model comprising the steps of:
   (a) collecting financial news for a financial instrument;
   (b) analyzing said financial news;
   (c) classifying said financial news into categories;
   (d) obtaining distributions for the changes in price of said financial instrument for a set period of time;
   (e) obtaining distributions for the changes in price of said financial instrument as a result of financial news for each news category for a set period of time;
   (f) determining if the distributions for the changes in price of said financial instrument are statistically significantly different than the distributions for the changes in price of said financial instrument for a particular news category; and
   (g) producing a trading recommendation output for each news category indicating the action that should be taken for the financial instrument.

2. A method according to claim 1 wherein said financial news categories include good news, bad news, mixed news and mention news.

3. A method according to claim 1 wherein the distribution of price changes for the financial instrument is assumed to be approximately Normal, and said distribution is represented as $\sim N(\mu_{stock}\sigma_{stock})$.

4. A method according to claim 1 wherein the distribution of price changes for the financial instrument for a particular news category is assumed to be approximately Normal, and said distribution is represented as $\sim N(\mu_{news\ class}\sigma_{news\ class})$.

5. A method according to claim 1 wherein the change in price of a financial instrument is determined by
   (a) subtracting the initial closing price from the final closing price to obtain a price difference; and
   (b) dividing said difference by the initial closing price.

6. A method according to claim 1 wherein distributions are gathered for differences in price of said financial instrument for one business day.

7. A method according to claim 1 wherein distributions are gathered for differences in price of said financial instrument for two business days.

8. A method according to claim 1 further comprising the step of providing a user interface which identifies and classifies said financial news.

9. A method according to claim 1 wherein the trading recommendation outputs produced are "BUY", "SELL" and "NO-TRADE".

10. A method according to claim 9 where a BUY trading recommendation output results when
    (a) the distribution for the change in price of a financial instrument is statistically significantly different than the distribution for the change in price of said financial instrument for a particular news category; and
    (b) the mean for the change in price of said financial instrument for a particular news category is greater than zero.

11. A method according to claim 9 where a SELL trading recommendation output results when
    (a) the distribution for the change in price of a financial instrument is statistically significantly different than the distribution for the change in price of said financial instrument for a particular news category; and
    (b) the mean for the change in price of said financial instrument for a particular news category is less than zero.

12. A method according to claim 9 where a NO-TRADE trading recommendation output results when:
   (a) the distribution for the change in price of a financial instrument is not statistically significantly different than the distribution for the change in price of said financial instrument for a particular news category; and
   (b) the mean for the change in price of said financial instrument for a particular news category is equal to zero.

13. A method according to claim 9 wherein said price prediction model further comprises the steps of:
   (a) producing more BUY trading recommendation outputs than the number of SELL and NO-TRADE trading recommendation outputs combined;
   (b) buying said financial instrument;
   (c) holding said financial instrument; and
   (d) selling said financial instrument.

14. A method according to claim 13 wherein said financial instrument is held for a, target period, and then sold.

15. A method according to claim 9 wherein said price prediction model further comprises the steps of:
   (a) producing more SELL trading recommendation outputs than the number of BUY and NO-TRADE trading recommendation outputs combined;
   (b) selling said financial instrument; and
   (c) repurchasing said financial instrument.

16. A method according to claim 15 wherein said financial instrument is repurchased after a target period.

17. A method according to claim 9 wherein said price prediction model further comprises the steps of:
   (a) producing no BUY or SELL trading recommendation output; and
   (b) no trading of said financial instrument.

18. A method for creating a price prediction model comprising the steps of:
   (a) collecting financial news for a stock;
   (b) analyzing said financial news;
   (c) classifying said financial news into categories;
   (d) obtaining distributions for the changes in price of said stock for a set period of time;
   (e) obtaining distributions for the changes in price of said stock as a result of financial news for each news category for a set period of time;
   (f) determining if the distributions for the changes in price of said stock are statistically significantly different than the distributions for the changes in price of said stock for a particular news category; and
   (g) producing a trading recommendation output for each news category indicating the action that should be taken for the stock.

* * * * *